(12) United States Patent
Yan et al.

(10) Patent No.: US 8,661,517 B2
(45) Date of Patent: *Feb. 25, 2014

(54) METHOD AND SYSTEM FOR ACCESSING NETWORK THROUGH PUBLIC EQUIPMENT

(75) Inventors: Zhengqing Yan, Shenzhen (CN); Shiwei Zhang, Shenzhen (CN); Tao Fu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/520,609

(22) PCT Filed: Oct. 19, 2010

(86) PCT No.: PCT/CN2010/077882
§ 371 (c)(1),
(2), (4) Date: Jul. 5, 2012

(87) PCT Pub. No.: WO2011/088695
PCT Pub. Date: Jul. 28, 2011

(65) Prior Publication Data
US 2012/0278874 A1     Nov. 1, 2012

(30) Foreign Application Priority Data
Jan. 20, 2010   (CN) .......................... 2010 1 0002849

(51) Int. Cl.
*G06F 7/04* (2006.01)

(52) U.S. Cl.
USPC .......................................................... 726/7

(58) Field of Classification Search
None
See application file for complete search history.

(56) References Cited

U.S. PATENT DOCUMENTS

| 7,778,199 B2 * | 8/2010 | Booth et al. ................... 370/254 |
| 2007/0157309 A1 * | 7/2007 | Bin et al. ........................ 726/15 |
| 2007/0186113 A1 | 8/2007 | Cuberson |
| 2008/0066190 A1 | 3/2008 | Shu |
| 2009/0258637 A1 | 10/2009 | Liu et al. |

(Continued)

FOREIGN PATENT DOCUMENTS

| EP | 2051473 A1 | 4/2009 |
| JP | 2009-175923 A | 8/2009 |
| KR | 2004-0034501 A | 4/2004 |
| KR | 2006-0029047 A | 4/2006 |

OTHER PUBLICATIONS

International Search Report for PCT/CN2010/077882 dated Jan. 27, 2011.

*Primary Examiner* — Jeffrey Pwu
*Assistant Examiner* — Carlos Amorin
(74) *Attorney, Agent, or Firm* — Banner & Witcoff, Ltd.

(57) ABSTRACT

A method and system for accessing to a network through public equipment are provided. The method includes: after an access service node (ASN) receives a network access request message from a user on public equipment, the ASN sending the network access request message to an authentication center (AC), wherein, the network access request message comprises at least the user's account and password; the AC verifying validity of the account and the password, if the verification is passed, sending the user's access identifier (AID) to the ASN; and after the ASN receives the user's AID, the ASN sending the user's AID to the public equipment, the public equipment taking the user's AID as a virtual AID and using the virtual AID to send and receive user's messages. By the present invention, users who access to the network through the public equipment can be tracked and traced effectively.

20 Claims, 5 Drawing Sheets

(56) References Cited

U.S. PATENT DOCUMENTS

| | | | |
|---|---|---|---|
| 2010/0125891 A1* | 5/2010 | Baskaran | 726/1 |
| 2011/0138446 A1* | 6/2011 | Barrett et al. | 726/3 |
| 2012/0180117 A1* | 7/2012 | Sun | 726/7 |
| 2012/0180122 A1* | 7/2012 | Yan et al. | 726/15 |
| 2012/0284407 A1* | 11/2012 | Yan et al. | 709/225 |
| 2013/0125246 A1* | 5/2013 | Yan et al. | 726/28 |
| 2013/0139232 A1* | 5/2013 | Carolan et al. | 726/6 |
| 2013/0167196 A1* | 6/2013 | Spencer et al. | 726/3 |

\* cited by examiner

METHOD AND SYSTEM FOR ACCESSING NETWORK THROUGH PUBLIC EQUIPMENT

TECHNICAL FIELD

The present invention relates to the fields of mobile communications and Internet, and more especially, to a method and system for accessing to a network on public equipment.

BACKGROUND TO THE RELATED ART

When a user accesses to the network on public equipment in the existing Internet Protocol (IP) network, he/she directly uses the public equipment's IP address to communicate with other users, and the network supervision agencies cannot track and trace the users accessing to the network on the public equipment. For example, in the existing network, ID card needs to be shown in order to access to the Internet, but most internet bars still cannot verify the authenticity of the documents, and even though there is no legal document, a user can surf the net with a certain public document provided by the Internet bars, which brings great difficulties for the network supervision agencies to track and trace.

Moreover, in the existing network, since the traditional IP address has the ambiguity of identification and location, the users are allowed to log in their own business accounts, such as e-mail, online banking, and so on, on the public equipment, but it cannot achieve the binding of the network layer IP and the application layer services for the user, once an account is lost, it may bring the user a great loss. If the binding of the network layer IP and the application layer services for the user is achieved with the traditional IP technology, when a user accesses to the network on the public equipment, due to the difference of the network layer IP addresses, the user will not be able to access his/her application layer services. For the network supervision agents, since the account cannot be bound with the user's IP, the supervision on the user has also been weakened.

In summary, the current traditional IP technology has the following problems:

1, since the traditional IP address has the ambiguity of identification and location, the supervision agencies cannot effectively track and trace the users accessing to the network on the public equipment, which not only has a security risk but also has difficulties to crack down illegal and criminal activities;

2, in addition, the ambiguity of identification and location of the traditional IP address also makes the users cannot bind the network layer IP with the application layer services, which cannot effectively protect the security of the application layer services.

SUMMARY OF THE INVENTION

The technical problem to be solved in the present invention is to provide a method and system for accessing to a network on public equipment to effectively trace and track users accessing to the network on the public equipment in a subscriber identifier and locator separation network, To solve the aforementioned problem, the present invention provides a method for accessing to a network on public equipment to be applied to a subscriber identifier and locator separation network, the method comprising:

after an access service node (ASN) receives a network access request message from a user on public equipment, the ASN sending the network access request message to an authentication center (AC), wherein, the network access request message comprises at least the user's account and password;

the AC verifying validity of the account and the password, if the verification is passed, sending the user's access identifier (AID) to the ASN; and after the ASN receives said user's AID, the ASN sending the user's AID to the public equipment, the public equipment taking the user's AID as a virtual AID and using the virtual AID to send and receive user's messages.

Preferably, after the ASN receives said user's AID, the ASN performing attachment on the user's AID to establish a mapping relationship of the user's AID and the ASN's routing identifier (RID) and reporting the mapping relationship to said user's identification and location register (ILR).

Preferably, after the ASN receives the user's AID, the ASN establishes a mapping table of the user's AID and the public equipment's AID.

Preferably, at the same time that the ASN establishes the mapping table of the user's AID and the public equipment's AID, the ASN sets attribute of the user's AID as a virtual AID, and queries the mapping table when a message that takes the virtual AID as a source address or a destination address is received to acquire the public equipment's AID, and collects and bills traffic of the public equipment.

Preferably, the ASN prohibits managed public equipment from accessing to other users or equipments except of the AC.

Preferably, the ASN prohibits the managed public equipment from accessing to other users or equipments except of the AC in the following way:

said ASN filing the managed public equipment's AID;

when receiving a message, if the message's source address is the filed AID and the destination address is not the AC's AID, or the message's destination address is the filed AID and the source address is not the AC's AID, discarding this message.

Preferably, after the user accesses to the network on the public equipment and is online in the network, when said user gets offline, said user sends an offline request on the public equipment, and the ASN sends the offline request to the AC;

after the AC deletes online status of the user in the network, the AC sends an offline request response to the ASN;

the ASN removes the attachment on the user, and requests the ILR to delete the mapping relationship of the user's AID and the ASN's RID; at the same time, the ASN deletes the mapping table of the user's AID and the public equipment's AID and sends the offline request response to the public equipment; and after the public equipment receives the offline request response, the public equipment deletes said user's virtual AID.

Preferably, the user's account and password are pre-assigned by a network manager, or are acquired by submitting personal identification information online; and at the same time of assigning the account, a bound AID is assigned to the user.

Preferably, the method also comprises:

after the ASN receives the network access request message, the ASN judging whether the network access request message comes from the public equipment or not, if the network access request message is not from the public equipment, the ASN sending the network access request message to the AC, and forwarding the network access response from the AC to the initiator of the network access request message.

The present invention also provides a system for accessing to a network on public equipment to be applied to a subscriber identifier and locator separation network, the system comprising: access service nodes (ASNs), public equipment and an Authentication Center (AC), wherein, said ASN is set to, after receiving a network access request message sent by a user on the public equipment, send the network access request message to the AC, wherein, the network access request message comprises at least the user's account and password; and after said user's access identifier (AID) sent by the AC is received, send the user's AID to public equipment;

said AC is set to, after the user's network access request message is received, verify validity of said account and password in the request message, if the verification is passed, send the user's AID to the ASN;

the public equipment is set to, send the network access request message to the ASN according to the account and password input by the user, and after receiving the user's AID sent by the ASN, take the user's AID as a virtual AID and use the virtual AID to send and receive the user's messages.

Preferably, the system also comprises an identification and location register (ILR), the ASN is also set to, after said user's AID is received, perform attachment on said user's AID to establish a mapping relationship of said user's AID and the ASN's routing identifier (RID), and report the mapping relationship to said user's ILR;

said ILR is set to, save the mapping relationship of the user's AID and the ASN's RID; and, after receiving a mapping relationship query request initiated by another ASN according to the user's AID, return the RID corresponding to the user's AID to the ASN that initiates the query request.

Preferably, the ASN is also set to, after receiving said user AID, establish the mapping table of the user's AID and the public equipment's AID.

Preferably, the ASN is also set to, net attribute of the user's AID as a virtual AID, and when a message that takes the virtual AID as a source or destination address is received, query the mapping table to acquire the public equipment's AID, and collect and bill traffic of the public equipment.

Preferably, the ASN is also set to, prohibit managed public equipment from accessing to other users or equipments except of the AC.

Preferably, the ASN is also set to, after the user's offline request is received, send the request to said AC; and after receiving an offline request response, remove the attachment on the user, and request the ILR to delete the mapping relationship of the user's AID and the ASN's RID, at the same time, remove the mapping table of the user's AID and the public equipment's AID, and send the offline request response to the public equipment;

the AC is also set to, after receiving the offline request and deleting the online status of the user in the network, send an offline request response to the ASN;

the public equipment is also set to, after the offline request response is received, delete the user's virtual AID.

The aforementioned implementation solution is based on the subscriber identifier and locator separation network, and the uniqueness of the user's AID is adopted in the entire network to achieve the user accessing to the network on the public equipment. Compared with the existing traditional IP network, the advantages of the subscriber identifier and locator separation network can be fully used when the aforementioned implementation solution is applied, and the users accessing to the network on the public equipment can be effectively tracked and traced on the basis of the uniqueness of the AID in the entire network.

PREFERRED EMBODIMENTS OF THE PRESENT INVENTION

Figure 1:
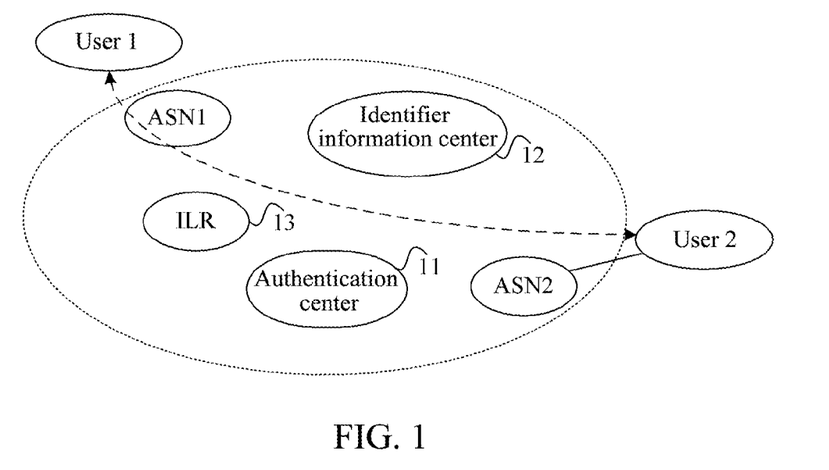
FIG. 1 is a diagram of the architecture of the SILSN in accordance with an embodiment of the present invention.

In order to solve the problem of the ambiguity of the identification and location in the existing traditional IP address, the present invention provides a system architecture of a Subscriber Identifier & Locator Separation Network (SILSN) shown in FIG. 1, in the FIG. 1, the SILSN system consists of Access Service Nodes (ASNs), users, the Authentication Center (AC) 11, the Identifier Information Center (IIC) 12, the identification & Location Register (ILR) 13, and so on, Among them, the ASN is mainly responsible for the user's access, and undertaking the billing, switching and other functions; the ILR is set to undertake the user's location registration and identifier and locator identification, as well as the location query function; the AC is responsible for verifying the user's access; the IIC is responsible for storing the user's identification information.

There are two identification types in the aforementioned SILSN architecture: access identifier (AID) and Routing Identifier (RID). Wherein, the AID is the user's identifier, this identifier is assigned only to this user and is unique in the whole network, and this identifier can be unique and unchanged in the network transmission, and when the user moves in the network, the AID keeps unchanged and is unique in the entire network. The users routes the messages with their attached ASNs' RIDs. It should be noted that the identity identifier and the location identifier might have different names in different SILSN architectures, but the substances are the same.

The aforementioned SILSN has the following feature: no user in this network can access until passing a rigorous verification. Each user carries his/her own AID in the packets sent in a variety of services, and each packet sent by the user must be ASN verified to ensure that the data packet sent by the user carries the user's access identifier, thus a user cannot impersonate another user's AID to access to the network, and this access identifier remains unchanged when transmitting in the network, arid when the user moves or switches, the identifier will not change.

In the example shown in FIG. 1, the users User1 and User2 have their unique access identifiers AID1 and AID2, the User1 and the User2 access to the network with the ASN1 and the ASN2 respectively. Wherein, the User2 accesses to the network normally, that is, the User 2 uses his/her own user equipment (UE) to access to the network, and his/her UE's AID is the AID that the User2 uses to bind with the services. However, the User1 accesses to the network on the public equipment, since the public equipment's AID is not the AID owned by the User1, it cannot bind with the user's application services.

For the aforementioned SILSN, in order to solve the problem, the basic implementation idea of the present invention is as follows: the network manager saves the user's account, password, and AID in the AC, the user uses his/her own account and password to access to the network; the AC verifies the user's account and password, after the user is authenticated, the AC sends the user's AID to the ASN and the public equipment; and takes the user's AID that binds with the account as a virtual AID to bind to the public equipment.

Therefore, the binding of the User1's AID and the application services can be achieved. It should be noted that the user's account might be directly assigned by the network manager, or applied by the user through submitting his/her personal information online in the public network. While the account is assigned, an AID will be assigned to bind with the account.

More specifically, the present invention uses the following solution to address the issue of accessing to the network on the public equipment based on the SILSN:

after the ASN receives the network access request message sent by the user on the public equipment, it sends the request message to the AC, and the network access request message comprises at least the user's account and password;

the AC verifies the validity of said account and password, if the verification is passed, sends the user's AID to the ASN;

the ASN sends the user's AID to the public equipment, and the public equipment takes said user's AID as a virtual AID and uses the virtual AID to send and receive the user's messages.

Furthermore, after the AC verifies the validity of said account and password, it sends a network access response message to the ASN, and if the verification is passed, the user's AID is carried in the access network response message;

after the ASN receives the network access response message containing the AID, it performs attachment on the user's AID, and establishes the mapping relationship of the user's AID and the ASN's RID, and reports the mapping relationship to said user's HA; and establishes a mapping table of the user's AID and the public equipment's AID.

Furthermore, if the verification is passed, the ASN also sets the attribute of the user's AID as a virtual AID.

Furthermore, the user inputs his/her account and password on the public equipment, and sends a network access request message to the ASN, and the network access request message comprises at least the user's account and password;

the ASN judges whether the network access request message comes from the public equipment or not, if yes, performs attachment on the user's AID if the access network response message that passes the verification is received, and establishes the user's AID and the public equipment's AD mapping table; if the message does not come from the public equipment, the message only needs to be forwarded to the AC to verify, and the received network access response message is forwarded to the initiator of the network access request.

Furthermore, the ASN will prohibit the public equipment from accessing to the users except of the AC.

In the following, the implementation of the technical scheme of the present invention will be described in further detail with combination of the accompanying drawings and specific embodiments. It should be noted that the content of the present invention can be explained with the following embodiments, but the content of the present invention is not limited to the following embodiments.

Figure 2:
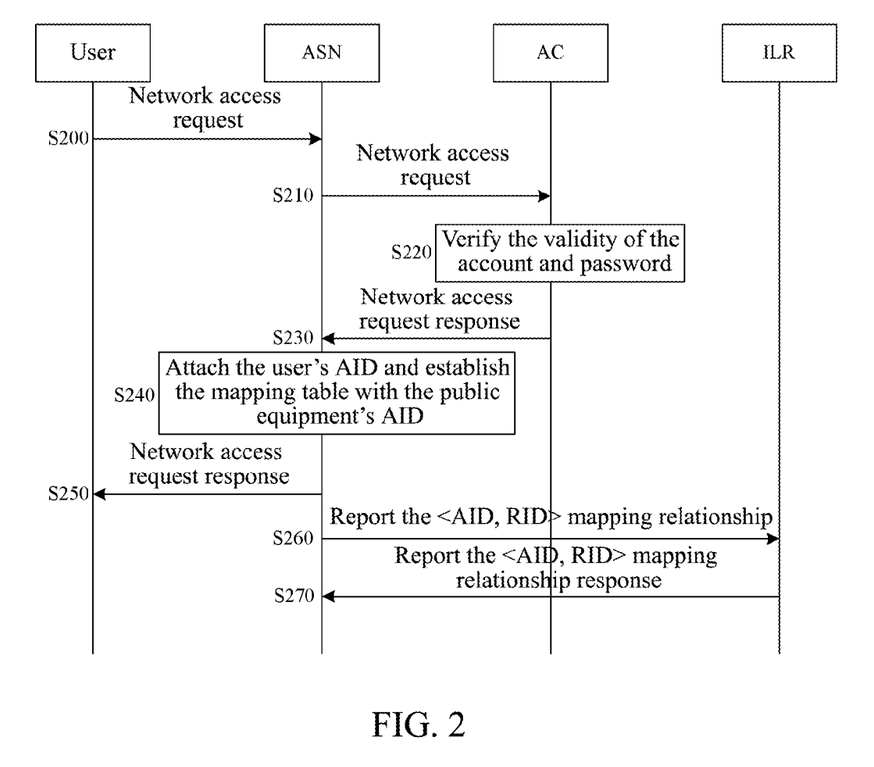
FIG. 2 is a flow chart of a user accessing to the network on the public equipment in accordance with an embodiment of the present invention.

FIG. 2 shows the process of a user accessing to the network with his/her account on the public equipment. The user inputs his/her own account on the public equipment, and inputs the password to apply to access to the network. The application information is sent to the AC to process, the AC queries to acquire the password of the account as well as the AID according to the account. Then, the AC uses the queried account information to verify the authenticity of the account and password submitted by the user so as to verify whether the network access request from the user can be accepted or not. If the verification is successful, the AC sends the user's AID to the user's public equipment. The process specifically comprises the following steps.

S200, the User inputs his/her account and password on the public equipment and sends a network access request message to the ASN, and the network access request message comprises the User's account and password.

Herein, the source AID of the message is the public equipment's AID, and the destination AID is the AC's AID;

S210, the ASN receives the User's network access request message from the public equipment, and forwards the message to the AC to process.

In this step, the ASN needs to judge whether the network access request message comes from the public equipment or not, if the message does not come from the public equipment, for example, an ordinary home accesses through a PC or UE, the user carries his/her own AID in the network access request, the ASN sends the request to the AC to verity, and after the network access request response from the AC is received, if the verification is passed, the ASN directly performs attachment on the user's AID. The difference from accessing on the public equipment is that, the AC only needs to return the response message indicating whether the verification is passed or not, while the user's AID does not need to be sent; the ASN does not need to establish the mapping table of the user's AID and the public equipment's AID either.

S220, after the AC receives the User's network access request message from the public equipment, the AC verifies the validity of the account and password in the request message, for example, it extracts the User's account and password in the request message, and compares them with the corresponding account and password stored in the AC, if they are consistent, the verification is successful, otherwise the verification fails.

S230, the AC sends a network access request response message to the ASN, and the message carries the User's AID.

S240, after the ASN receives from the User's network access verification response message from the AC, if the verification is passed, the ASN performs the attachment on the User's AID, and establishes the <AID, RID> mapping relationship with the ASN's own RID, and at the same time, establishes the AID mapping table in the form of <AID, RID> for the User and the public equipment, optionally, the ASN sets the User's AID attribute as the User's virtual AID; if the verification is not passed, the ASN directly forwards to the access network verification response message from the AC.

S250, after the public equipment receives the network access authentication response message, the public equipment takes the User's AID as a virtual AID in its own system if the authentication is passed, and all the User's network behavior on the public equipment takes the virtual AID as the source AID.

For example, when the User accesses to the File Transfer Protocol (FTP) server, the source AID in the sent access request message is the virtual AID.

S260, the ASN reports the user's <AID, RID> mapping relationship to the ILR.

Wherein, the purpose of the user establishing a <AID, RID> mapping relationship with the ASN and reporting the relationship to the ILR is to explain that the User is attached to the ASN to facilitate the other users and the ASNs to query the ILR of the corresponding RID information based on the user's AID, and then send the messages to the ASN according to the queried RID information.

S270, after the ILR records or updates the User's <AID, RID> mapping relationship, it returns and reports the mapping relationship response message to the ASN.

Afterwards, after the ILR receives the query request of the user's mapping relationship from another ASN, it returns the RID corresponding to the user's AID to the query side, that is, the ASN initiating the query request.

It should be noted that, in the aforementioned steps, the S260 and S270 might be implemented before the S250, and the order of the implementation depends on the implementation method within the ASN.

Figure 3:
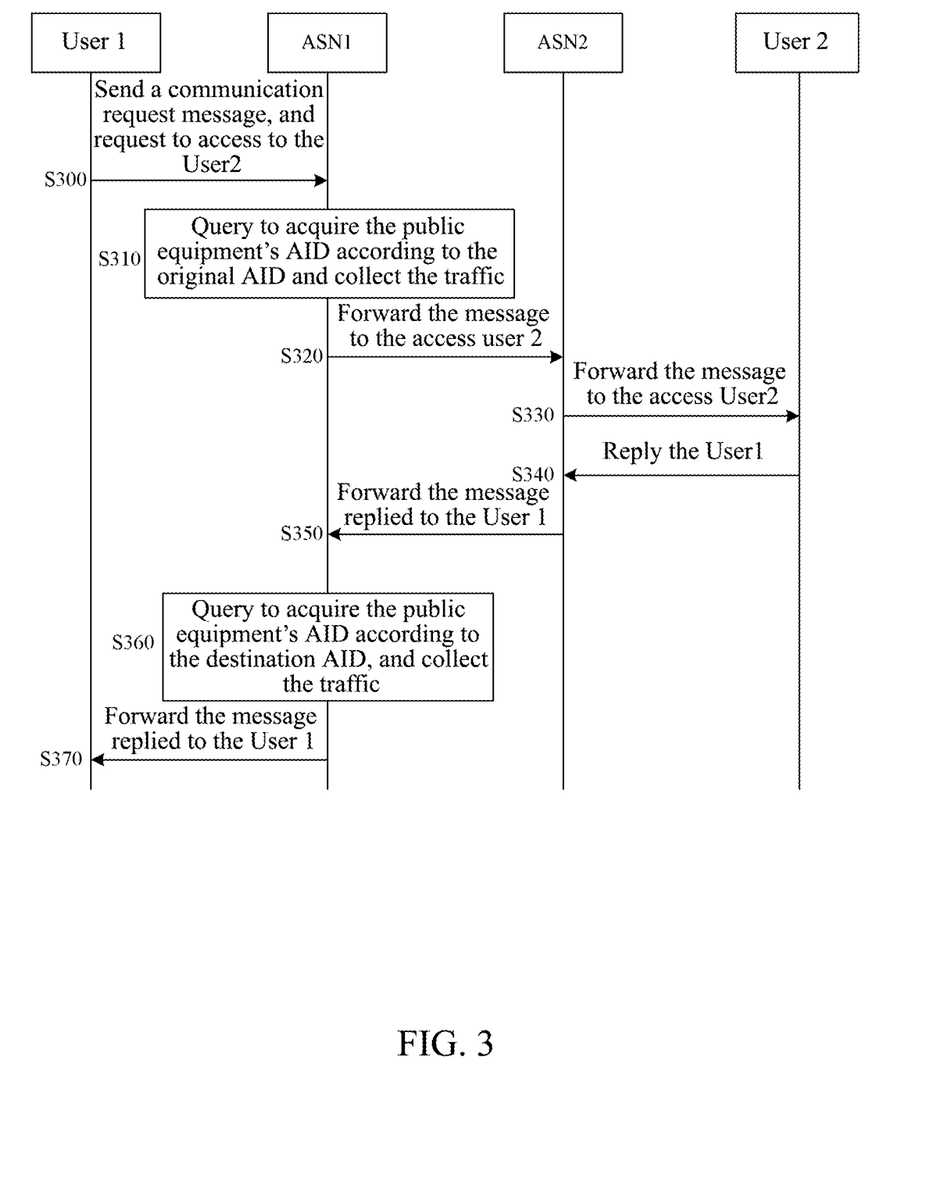
FIG. 3 is a flow chart of forwarding messages when a user is online on the public equipment in accordance with an embodiment of the present invention.

FIG. 3 is a flow chart of forwarding messages when the user is online on the public equipment. The online behavior of the user on the public equipment is basically consistent with the online behavior of the user on his/her own equipment, which is in line with the tracking and traceability requirements of the network managers and supervision agencies on the users, meanwhile, it also solves the problem of binding the user network layer AID and the application layer services. The difference lies in that the ASN needs to collect the traffic of the public equipment in order to achieve the management of the public equipment. The process specifically comprises the following steps.

S300, the User1 sends a communication request message to the User2 on the public equipment, and the source AID in the packet is the virtual AID (the User1's AID).

Wherein, besides of its own AID, the public equipment's system also allows the users that successfully access to the network on the public equipment to attach their AIDs to the public equipment. In other words, when the user's AID is attached to the public equipment, the AID used by the public equipment to send and receive messages is the user's virtual AID, rather than the public equipment's own AID. When the user exits the network, the virtual AID is also deleted, and then the AID used by the public equipment to send and receive message is its own S310, after the ASN1 receives a message from the public equipment and finds out that the source AID is the virtual AID according to the attribute of the AID of the attached user set by the ASN, the ASN1 uses the AID to query the User1's AID and the public equipment's AID mapping table to query and acquire the public equipment's AID and then collects the traffic of the public equipment.

S320, the ASN1 queries the ILR of the corresponding RID (ASN2's RID) according to the destination AID, that is, the User2's AID, in the User1's communication request message, and takes the ASN1's RID as the source RID, and encapsulates the ASN2's RID in the message as the destination RID, and routes and forwards the message to the ASN2.

S330, after the ASN2 receives the aforementioned message, the ASN2 de-encapsulates the RID and forwards the User1's communication request message to the User2.

S340, the User2 replies the User1's communication request, the source address in the response message is the User2's AID, and the destination address is the User's AID;

S350, after the ASN2 encapsulates the source RID (the ASN2's RID) and the destination RID (the ASN1's RID) in the response message, the ASN2 forwards the message to the ASN1.

This example is described by taking the User1 initiating the communication to the User2 as an example. If the User2 initiates a communication to the User1, the ASN2 queries the ILR to acquire the corresponding ASN1's RID according to the destination address, that is, the User1's AID, in the User2's communication request message, encapsulates it in the message, and forwards and routes the message to the ASN1, the communication process is similar to this example and is not repeated here.

S360, after the ASN1 receives the message from the ASN2, the ASN1 checks and finds that the destination AID is the virtual AID, and uses the AID to query the user1's AID and the public equipment's AID mapping table to query and acquire the public equipment's AID and collects the traffic of the public equipment.

S370, after the ASN1 removes the RID encapsulated in the message, the ASN1 forwards the User2's response message to the User1.

At this point, the process of the user forwarding the message on the public equipment ends.

It should be noted, that the ASN1 uses the User1's AID and the public equipment's AID mapping table to query and acquire the public equipment's AID, and then collects the traffic is only one of the functions. The functions can be achieved by the ASN1 according to the AID mapping table are not limited to traffic collection, they also comprise recording the specific location of the Used accessing to the network, billing the public equipment, and other functions.

Figure 4:
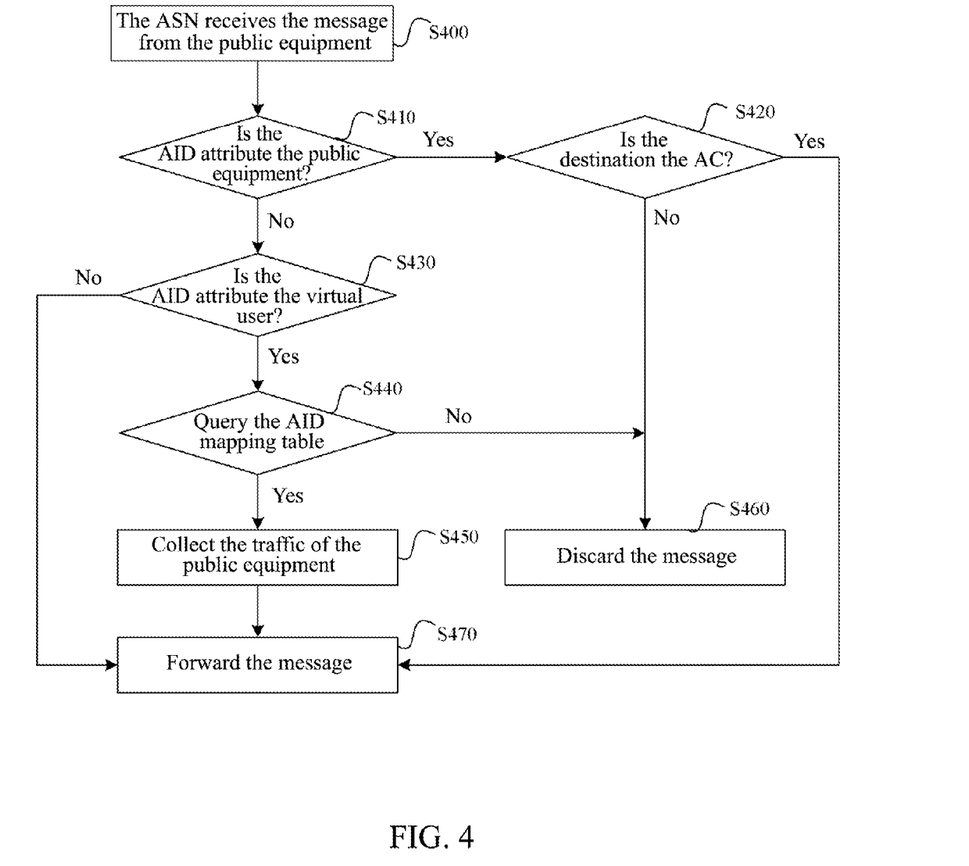
FIG. 4 is a flow chart of the ASN processing the messages from the public equipment in accordance with an embodiment of the present invention.

FIG. 4 shows the process of the ASN processing the messages from the public equipment. In this example, the ASN needs to check whether the source AID is the public equipment's AID or not, if yes, it needs to prohibit the public equipment from directly accessing to the destination of a non-AC. The process specifically comprises the following steps.

S400, the ASN receives a message from the public equipment (such as the PCs in the Internet bar).

S410, the ASN extracts the source AID in the message, and judges whether it is the public equipment's AID or not, if yes, proceed to S420; otherwise, proceed to S430.

Wherein, the ASN queries to acquire the source AID according to the list including all the AIDs in the ASN, and then judges whether the source AID is the public equipment or not by querying the attribute of the source AID. There might be a variety of AID attributes, such as the aforementioned public equipment's attribute, as well as the virtual AID, the AID that needs to be redirected, and so on.

In addition, the AID might also judge whether the aforementioned source AID is the public equipment or not through a variety of other ways, for example, the ASN files the AIDs of all the public equipments on it, and individually saves them as the public equipment's AID list; when receiving a message, the ASN judges whether the source AID is the public equipment or not according to the filed public equipment's AID list, and so on. They are no listed one by one here.

S420, the ASN judges whether the destination of the message is the AC or not, if yes, proceed to the S470, and forwards the message normally; otherwise, proceed to step S460, and discards the message;

S430, if the AID is not the public equipment's AID, the ASN judges whether the AID attribute is the virtual user or not, that is, whether the AID is the virtual AID for the user accessing to the network on the public equipment or not, and if yes, proceed to S440; otherwise, proceed to S470 and normally forwards the message.

S440, according to the virtual AID for the user accessing to the network on the public equipment, whether there is the corresponding AID mapping table with the public equipment's AID or not is checked, if there is the AID mapping table, proceed to S450; otherwise, proceed to S460, and discard the message.

S450, the ASN collects the traffic of the public equipment according to the queried AID mapping table, and proceed to step 470.

S460, the message is discarded; and the process ends.

S470, the message is forwarded normally. It should be noted that the S470 is skipped from the step S420, S430 or S450.

At this point, the process of forwarding messages from the public equipment by the ASN ends.

Figure 5:
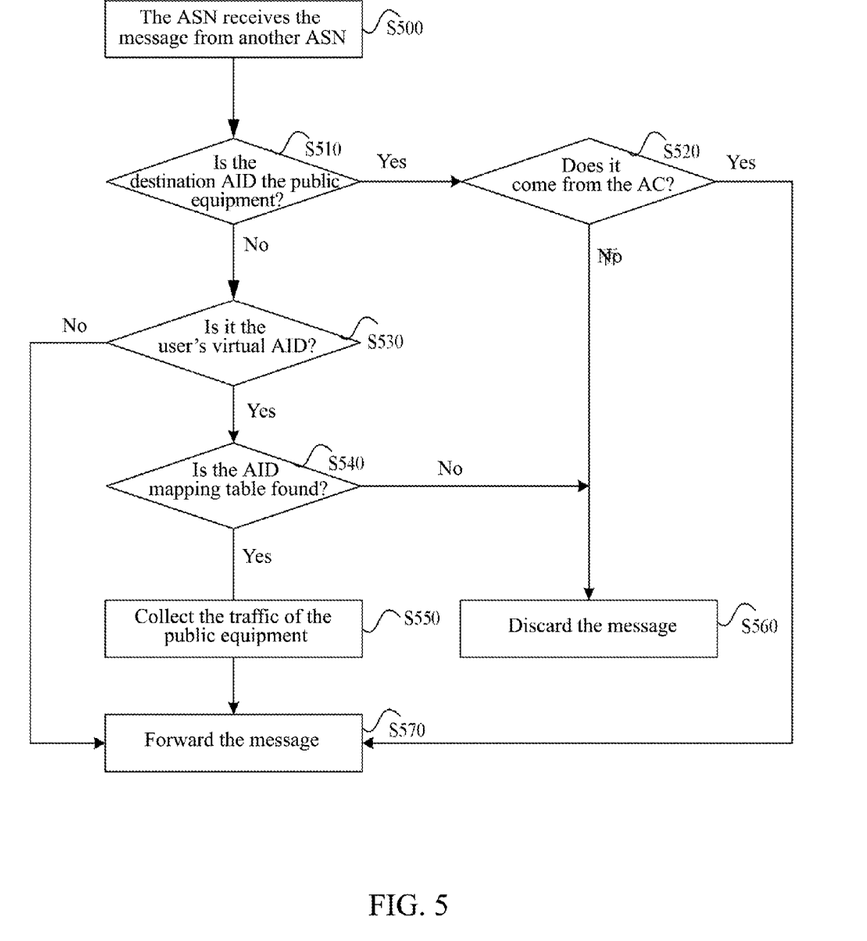
FIG. 5 is a flow chart of an ASN processing messages from another ASN in accordance with an embodiment of the present invention.

FIG. 5 shows the process of the ASN processing a message from another ASN. In this example, the ASN needs to check whether the destination AID is the virtual AID of the user accessing to the network on the public equipment or not. The process specifically comprises the following steps.

S500, the ASN receives a message from another ASN.

S510, the ASN extracts the source AID and the destination AID in the message, and judges whether the destination AID is the public equipment's AID or not, if yes, proceed to S520; otherwise, proceed to S530.

S520, the ASN judges whether the message comes from the AC or not, if yes, proceed to S570, and normally forwards the message; otherwise, proceed to step S560, and discards the message.

S530, the ASN judges whether the destination AID of the message is the virtual AID for the user accessing to the network on the public equipment or not, and if yes, proceed to the S540; otherwise, proceed to S570 and normally forwards the message.

S540, if the destination AID of the message is the virtual AID of the user accessing to the network on the public equipment, the ASN checks whether it has the AID mapping table with the public equipment's AID or not according to the virtual AID, if yes, proceed to S550; otherwise, proceed to S560, and discards the message.

S550, the ASN collects the traffic of the public equipment according to the public equipment's AID, proceed to step 570.

S560, the message is discarded; and the process ends.

S570, the ASN forwards the message normally. It should be noted that the S570 is preceded from the step S520, S530 or S550.

At this point, the process of the ASN processing the message from another ASN is completed.

Figure 6:
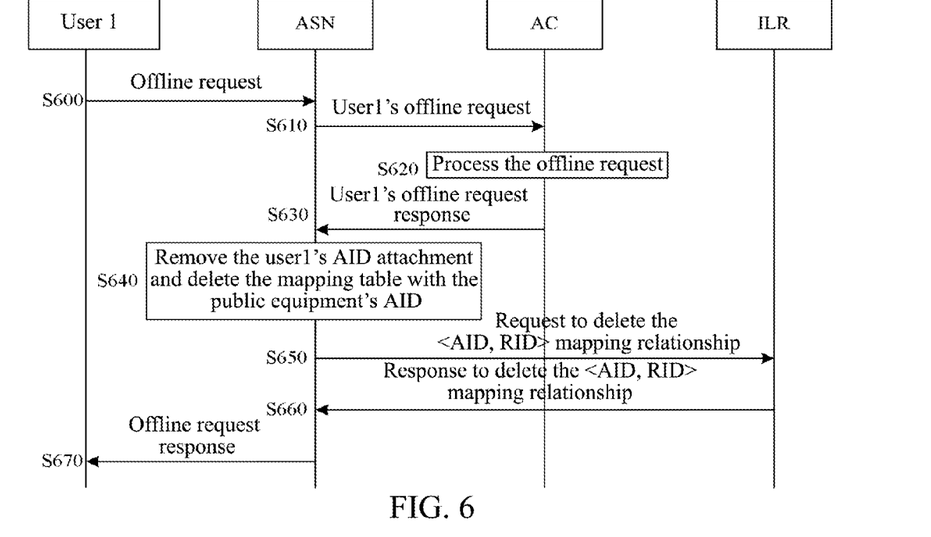
FIG. 6 is a flow chart of the user getting offline in accordance with embodiment of the present invention.

FIG. 6 is the process of the user getting offline. The user has accessed the network on the public equipment and is online, when the user needs to get offline, he/she sends an offline request to the AC, all the AC, the ILR and the ASN are required to delete the record associated with the user's AID. The process specifically comprises the following steps.

S600, the user User1 accessing to the network on the public equipment sends an offline request to the AC through the ASN.

S610, the ASN receives the User1's offline request and forwards it to the AC to process.

S620, the AC receives the offline request from the User1 and deletes the User1's online status in the network.

S630, the AC sends an offline request response to the ASN to notify the ASN to delete the User1 related information.

S640, the ASN receives the offline request response message from the AC, removes the User1's AID attachment, and at the same time, deletes the AID mapping table of the User1's AID and the public equipment's AID.

S650, the ASN reports the User1's <AID, RID> mapping relationship update to the ILR, and requests the ILR to delete the <AID,RID> mapping relationship.

S660, the ILR removes the User1's <AID, RID> mapping relationship, and sends a mapping relationship deletion response to the ASN.

S670, the ASN sends an offline successful response message to the public equipment, and deletes the User1's virtual AID attached to the public equipment.

At this point, the process of the user getting offline ends.

Figure 7:
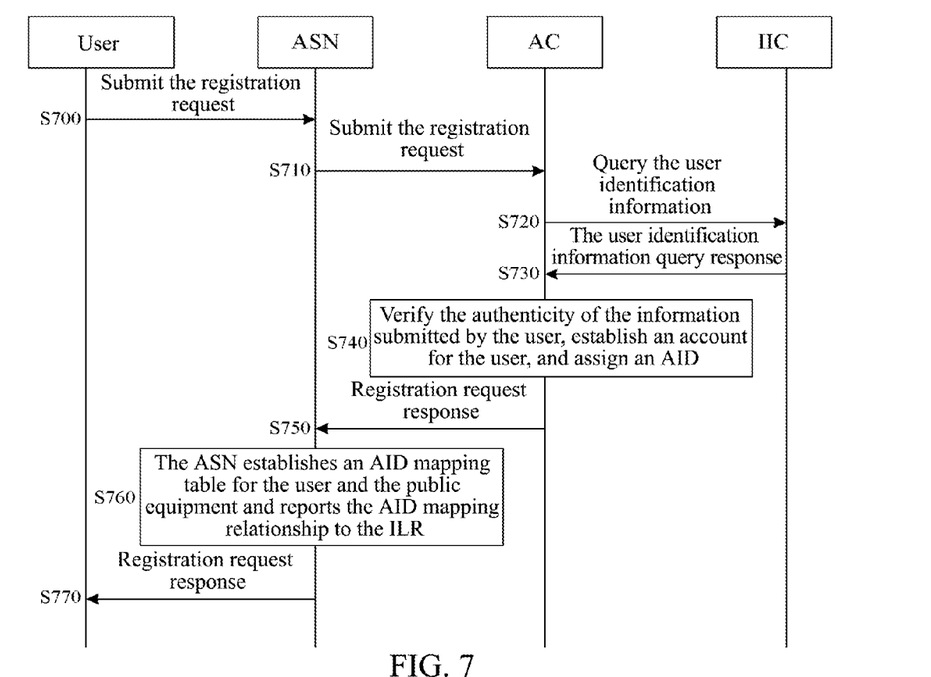
FIG. 7 is a flow chart of a user applying for an account on the public equipment in accordance with an embodiment of the present invention.

FIG. 7 shows the process of the user registering an account on the public equipment. In the condition that the network manager allows, the user can fill in his/her real personal information on the public equipment, and directly submit an account registration application. The user's real personal information is collected and saved by the network manager in the IIC in advance, and is used to verify the authenticity of the account application submitted by the user online. The process specifically comprises the following steps.

S700, the user fills in his/her personal information, such as ID number, home address, company, password, and so on, and sends an account registration application message to the AC.

S710, the ASN forwards the account registration application message to the AC.

S720, the AC receives the account registration application message, and according to the ID number in this message, queries the IIC of the User's real personal information.

S730, the IIC returns the queried User's real personal information to the AC.

S740, the AC uses the User's real personal information queried from the to verify whether the account registration message submitted by the User is valid or not, if it is valid (for example, the identity information submitted by the user online, such as the ID number, the name, the password, and so on, is consistent with the corresponding information provided by the IIC, that is, it is valid.), the AC assigns an account, a password, and an AID to the User.

S750, the AC sends a registration request response message to the ASN.

S760, the ASN attaches the User's AID, and establishes a mapping table with the public equipment's AID, and reports the mapping relationship to the ILR.

S770, the ASN sends the registration response message carrying the User's AID to the User, if the registration is successful, the User's AID is virtualized into the public equipment's AID. Since then, the AID of all the User's network behavior is this virtual AID.

Those skilled in the field can understand that all or part of the steps in the aforementioned method are completed by the program instructing the related hardware, and the program can be stored in a computer readable storage medium, such as a read-only memory, disk, or CD-ROM. Optionally, all or part of the steps in the aforementioned embodiments might also be implemented with one or more integrated circuits. Accordingly, each module/unit in the aforementioned embodiments can be implemented in the form of hardware or software functional modules. The present invention is not limited to any particular form of hardware and software combinations.

The above description is only the preferred embodiments of the present invention, and is not used to limit the present invention, and for those skilled in the field, the present invention might have a variety of modifications and changes. Any changes, equivalent replacements and improvements made within the spirit and principles of the present invention should be comprised within the protection scope of the present invention.

INDUSTRIAL APPLICABILITY

The method and system for accessing to the network on the public equipment provided in the present invention use the uniqueness of the user's AID in the entire network to achieve the user accessing to the network on the public equipment, the advantages of the subscriber identifier and locator separation network can be fully used when the aforementioned implementation solution is applied, thus the users accessing to the network on the public equipment can be effectively tracked and traced on the basis of the uniqueness of the AID in the entire network.

What is claimed is:

1. A method for accessing a network on public equipment, which is applied to a subscriber identifier and locator separation network, and the method comprising: after an access service node (ASN) receives a network access request message from a user on the public equipment, the ASN sending the network access request message to an authentication center (AC), wherein, the network access request message comprises at least an account and a password of the user; the AC verifying validity of the account and the password; if the verification is passed, sending an access identifier (AID) of the user to the ASN; and after the ASN receives the AID of the user, the ASN sending the AID of the user to the public equipment, the public equipment taking the AID of the user as a virtual AID and using the virtual AID to send and receive messages of the user.

2. The method of claim 1, wherein, the method also comprises:
after the ASN receives the AID of the user, the ASN performing an attachment on the AID of the user to establish a mapping relationship of the AID of the user and a routing identifier (RID) of the ASN and reporting the mapping relationship to an identification and location register (ILR) of the user.

3. The method of claim 2, wherein, the method also comprises:
after the ASN receives the AID of the user, the ASN establishing a mapping table of the AID of the user and an AID of the public equipment.

4. The method of claim 3, wherein, the method also comprises:
at the same time that the ASN establishes the mapping table of the AID of the user and the AID of the public equipment, the ASN setting attribute of the AID of the user as the virtual AID, and querying the mapping table when a message that takes the virtual AID as a source address or a destination address is received to acquire the AID of the public equipment, and collecting and billing traffic of the public equipment.

5. The method of claim 3, wherein, the method also comprises: after the user accesses the network on the public equipment and is online in the network, when the user gets offline, the user sending an offline request on the public equipment, and the ASN sending the offline request to the AC; after the AC deletes an online status of the user in the network, the AC sending an offline request response to the ASN; the ASN removing the attachment on the user, and requesting the ILR to delete the mapping relationship of the AID of the user and the RID of the ASN; at the same time, the ASN deleting the mapping table of the AID of the user and the AID of the public equipment and sending the offline request response to the public equipment; and after the public equipment receives the offline request response, the public equipment deleting the virtual AID.

6. The method of claim 3, wherein, the method also comprises:
the ASN prohibiting managed public equipment from accessing other users or equipments except the AC.

7. The method of claim 6, wherein, the ASN prohibits managed public equipment from accessing other users or equipments except the AC in the following way: the ASN filing an AID of the managed public equipment; when receiving a message, if a source address of the message is the AID of the managed public equipment which has been filed and a destination address of the message is not an AID of the AC, or the destination address of the message is the AID of the managed public equipment which has been filed and the source address of the message is not the AID of the AC, discarding the message.

8. The method of claim 2, wherein, the method also comprises: after the user accesses the network on the public equipment and is online in the network, when the user gets offline,
the user sending an offline request on the public equipment, and the ASN sending the offline request to the AC;
after the AC deletes an online status of the user in the network, the AC sending an offline request response to the ASN;
the ASN removing the attachment on the user, and requesting the ILR to delete the mapping relationship of the AID of the user and the RID of the ASN; at the same time, the ASN deleting a mapping table of the AID of the user and the AID of the public equipment and sending the offline request response to the public equipment; and
after the public equipment receives the offline request response, the public equipment deleting the virtual AID.

9. The method of claim 2, wherein, the method also comprises:
the ASN prohibiting managed public equipment from accessing other users or equipments except the AC.

10. The method of claim 9, wherein, the ASN prohibits the managed public equipment from accessing other users or equipments except the AC in the following way: the ASN filing an AID of the managed public equipment; when receiving a message, if a source address of the message is the AID of the managed public equipment which has been filed and a destination address of the message is not an AID of the AC, or the destination address of the message is the AID of the managed public equipment which has been filed and the source address of the message is not the AID of the AC, discarding the message.

11. The method of claim 1, wherein, the method also comprises:
the ASN prohibiting managed public equipment from accessing other users or equipments except the AC.

12. The method of claim 11, wherein, the ASN prohibits the managed public equipment from accessing other users or equipments except the AC in the following way: the ASN filing an AID of the managed public equipment; when receiving a message, if a source address of the message is the AID of the managed public equipment which has been filed and a destination address of the message is not an AID of the AC, or the destination address of the message is the AID of the managed public equipment which has been filed and the source address of the message is not the AID of the AC, discarding the message.

13. The method of claim 1, wherein,
the account and the password of the user are pre-assigned by a network manager, or are acquired by submitting personal identification information online; and at the same time of assigning the account, a bound AID is assigned to the user.

14. The method of claim 1, wherein, the method also comprises:
after the ASN receives the network access request message, the ASN judging whether the network access request message comes from the public equipment or not, if the network access request message is not from the public equipment, the ASN sending the network access request message to the AC, and forwarding a network access response from the AC to an initiator of the network access request message.

15. A system for accessing a network on public equipment, which is applied to a subscriber identifier and locator separation network, the system comprising: access service nodes (ASNs), the public equipment and an Authentication Center (AC), wherein, the ASN is set to, after receiving a network access request message sent by a user on the public equipment, send the network access request message to the AC, wherein, the network access request message comprises at least an account and a password of the user; and after an access identifier (AID) of the user sent by the AC is received, send the AID of the user to the public equipment; the AC is set to, after the network access request message is received, verify validity of the account and the password of the user in the network access request message; if the verification is passed, send the AID of the user to the ASN; the public equipment is set to, send the network access request message to the ASN according to the account and the password of the user input by the user, and after receiving the AID of the user sent by the ASN, take the AID of the user as a virtual AID and use the virtual AID to send and receive messages of the user.

16. The system of claim 15, wherein, the system also comprises an identification and location register (ILR),
the ASN is also set to, after the AID of the user is received, perform an attachment on the AID of the user to establish a mapping relationship of the AID of the user and a routing identifier (RID) of the ASN, and report the mapping relationship to the ILR;
the ILR is set to, save the mapping relationship of the AID of the user and the RID of the ASN; and, after receiving a mapping relationship query request initiated by another ASN according to the AID of the user, return a RID corresponding to the AID of the user to the ASN that initiates the mapping relationship query request.

17. The system of claim 15, wherein,
the ASN is also set to, after receiving the AID of the user, establish a mapping table of the AID of the user and an AID of the public equipment.

18. The system of claim 17, wherein,
the ASN is also set to, set attribute of the AID of the user as the virtual AID, and when a message that takes the virtual AID as a source or a destination address is received, query the mapping table to acquire the AID of the public equipment, and collect and bill traffic of the public equipment.

19. The system of claim 18, wherein,
the ASN is also set to, after an offline request of the user is received, send the offline request to the AC; and after receiving an offline request response, remove an attachment on the user, and request an ILR to delete a mapping relationship of the AID of the user and a RID of the ASN, at the same time, remove the mapping table of the AID of the user and the AID of the public equipment, and send the offline request response to the public equipment;
the AC is also set to, after receiving the offline request and deleting an online status of the user in the network, send the offline request response to the ASN;
the public equipment is also set to, after the offline request response is received, delete the virtual AID.

20. The system of claim 15, wherein,
the ASN is also set to, prohibit managed public equipment from accessing other users or equipments except the AC.

* * * * *